United States Patent
Harris

(10) Patent No.: US 8,560,332 B2
(45) Date of Patent: Oct. 15, 2013

(54) METHOD AND SYSTEM FOR RANKING SERVICES IN A WEB SERVICES ARCHITECTURE

(75) Inventor: Robert Harris, Christchurch (GB)

(73) Assignee: International Business Machines Corporation, Armonk, NY (US)

( * ) Notice: Subject to any disclaimer, the term of this patent is extended or adjusted under 35 U.S.C. 154(b) by 2927 days.

(21) Appl. No.: 10/531,246

(22) PCT Filed: Apr. 28, 2003

(86) PCT No.: PCT/GB03/01790
§ 371 (c)(1),
(2), (4) Date: Apr. 14, 2005

(87) PCT Pub. No.: WO2004/038621
PCT Pub. Date: May 6, 2004

(65) Prior Publication Data
US 2006/0112367 A1     May 25, 2006

(30) Foreign Application Priority Data

Oct. 24, 2002  (GB) .................................. 0224805.2

(51) Int. Cl.
*G06Q 10/00* (2012.01)
(52) U.S. Cl.
USPC ............................................................. 705/1.1
(58) Field of Classification Search
USPC ............................................................. 705/1.1
See application file for complete search history.

(56) References Cited

U.S. PATENT DOCUMENTS

2003/0130993 A1*  7/2003  Mendelevitch et al. .......... 707/3

FOREIGN PATENT DOCUMENTS

| JP | 2000-250992 | 9/2000 |
| JP | 2001-034493 | 2/2001 |
| JP | 2001-188835 | 7/2001 |

OTHER PUBLICATIONS

Definition of tModel, http://wearchsoa.techtarget.com/sDefinition/0,,sid26_gci805760,00.html.*
"Universal Description, Discovery, and Integration (UDDI)", Cover Pages hosted by OASIS-Online resource for markup language technologies, http://xml.coverpages.org/uddi.html.*
ProQuest Search.*

* cited by examiner

*Primary Examiner* — Gerardo Araque, Jr.
(74) *Attorney, Agent, or Firm* — Steven M. Greenberg, Esq.; Carey, Rodriguez, Greenberg & O'Keefe

(57) ABSTRACT

A method includes ranking services in a web services architecture and a web services architecture. The web services architecture has a hierarchy of services with a root originating service requester and a service of a first level in the hierarchy calling a service of a lower level. The originating service requestor indicates a preference regarding one or more services and a ranking machine provides a choice algorithm based on the preference. The originating service requestor invokes services of one or more levels of hierarchy. At each level of the hierarchy, a service uses a directory to find a set of possible lower-level services and the ranking machine applies the choice algorithm to the set of possible lower-level services. In one embodiment, the set of possible lower-level services is referred to the ranking machine from the directory and a preferred sequence is returned by the ranking machine to the directory.

12 Claims, 8 Drawing Sheets

METHOD AND SYSTEM FOR RANKING SERVICES IN A WEB SERVICES ARCHITECTURE

BACKGROUND OF THE INVENTION

This invention relates to a method and system for ranking services in a web services architecture. In particular, the invention relates to a web services architecture with an hierarchy of service providers in which the ranking is specified by the top level invoker.

Web services are described in the document "Web Services Conceptual Architecture (WSCA 1.0)" by IBM Software Group, May 2001. Web services provides a program-to-program communications model built on existing and emerging standards such as HTTP (hypertext transfer protocol), Extensible Markup Language (XML), Simple Object Access Protocol (SOAP), Web Services Description Language (WSDL) and Universal Description, Discovery and Integration (UDDI).

A web service is described through an interface that describes a collection of functions that are network-accessible through standardized XML messaging. A web service is described using a standard, formal XML notation, called a service description. The service description covers all the details necessary to interact with the service, including message formats, transport protocols and location. The interface hides the implementation details of the service allowing it to be used independently of the hardware or software platform on which it is implemented and also independently of the programming language in which it is written. It is also independent of the hardware and software environment of the caller. This allows web services-based applications to be loosely coupled, component-oriented, cross-technology implementations that can be published, located, and invoked across a network.

Web services are implemented in a network. The network could be a publicly-accessible network such as the Internet, an Intranet or any other form of network. Internet-available web services use commonly deployed network protocols. Such protocols may be HTTP or other Internet protocols such as SMTP or FTP. Other networks (e.g. Intranets) can use reliable messaging call infrastructures such as MQSeries, COBRA, etc.

The described method and system relate to an extension of the UDDI/WSDL protocol and XML/SOAP syntax to provide functions that are not currently available within the web services architecture.

Reference is made to the following documents available via www.uddi.org:
UDDI 2.0 Data Structure Reference;
UDDI 2.0 API Specification;
UDDI 2.0 Operators Specification; and
Web Services Description Language (WSDL) 1.1.

The aim of UDDI in web services is to provide open access to functions based on a directory or registry lookup. These services are described by the WSDL part and invoked by the XML/SOAP function. The binding of the invoker to the service is dynamic and not fixed. It is open in that the directory is freely available and there are no constraints applied to how the lookup or selection occurs. UDDI admirably meets this objective. However, where it fails is in concepts like quality of service.

The described method and system provide means whereby quality of service issues and other selection influencing factors can be introduced into the UDDI/WSDL arena.

In web services, a directory or registry is used to assemble software in a componentized fashion. The idea of UDDI is that a WSDL-formatted request is sent to a directory or registry server to select a service. This service selection can be specified on certain generally applicable criteria such as the company that is providing it and the function it does. This selection information is very generic; it is the same for all users and there is nothing specific to the originator of the request for the service that is mentioned.

The described method and system provide means whereby specific-to-originator criteria can be bought to bear on the lookup. Unlike in known prior art web services, the selection of the service is influenced by an originator or requester of the service selection.

The following is a practical example. A user's software is going to buy a book. The user looks up in a directory under the category of 'Book Sellers' and gets back a list of companies offering that service. However, the user has negotiated preferential rates with, say two, suppliers, and so wants to send the purchase request to either of these two in the first instance, and someone else as a third choice.

The user can do this by filtering the returned list of companies from the search because the search returned information to the user directly and the user is in control of what happens next.

A difference arises if the book purchase request is being done as part of the function of a service that is being provided by someone else. For example, the user may be building a library of StarTrek books. The user uses a 'Build a library' selection and gets back a list of suitable sellers. The user places his Get-me-a-library-for-StarTrek request to this supplier who will do the job. However, the user is now no longer in the position to use his favorite list of Book Sellers as the book-buying function is now being handled by someone else. In effect, they use their preferred suppliers instead of the users.

BRIEF SUMMARY OF THE INVENTION

One result of the described invention provides a way of getting books (or other items) purchased with the user's preferred sellers and not the intermediaries.

| User: | Library Builder: | Seller1: | UserPreferred Seller2: |
|---|---|---|---|
| Prior Art: | Build a library--->Buy book1--------->Buy | | |
| Invention: | Build a library--->Buy book1-------------------->Buy | | |

The described method and system relates to how WSDL/UDDI requests are biased according to the preference of the originator. What conditions influence a user's preferences are not discussed and are up to the user. Examples of conditions which may influence a user's preference include the standards of cost, efficiency, speed and reliability.

According to a first aspect of the present invention there is provided a method for ranking services in a web services architecture having a hierarchy of services with a root originating service requester, a service of a first level in the hierarchy calling a service of a lower level, the method comprising: the originating service requestor indicating a preference regarding one or more services and a ranking machine having a choice algorithm based on the preference; the originating service requestor invoking services of one or more levels of hierarchy; at each level of the hierarchy, a service using a directory to find a set of possible lower-level services; and the ranking machine applying the choice algorithm to the set of possible lower-level services.

The lower-level services may be service requestors or service providers.

In one embodiment, the set of possible lower-level services may be referred to the ranking machine from the directory and a preferred sequence may be returned by the ranking machine to the directory. The step of referring to the ranking machine may not be visible to the service using the directory.

In another embodiment, the set of possible lower-level services may be sent by the service using the directory to the ranking machine and a preferred sequence may be returned by the ranking machine to the service.

A single result or a sequence of results may be returned to the service using the directory.

Preferably, lower-level invocations of services in the hierarchy are not visible to higher-level services.

The preference of the originating service requestor may rank services in an order in which the originating service requestor wishes to use the services, may exclude services from being used, and/or may provide other selection influencing criteria.

The preference of the originating service requestor may be based on quality of service criteria including, for example, cost, efficiency, speed and reliability.

In a situation in which there is an originating service requestor's preference, the preference may override a selection by the service using the directory. If the preferred service is not available, a subsequent service may be obtained by reference to the originating service requestor's preference.

In a situation in which there is no stored originating service requestor's preference, the service using the directory may make the selection.

According to a second aspect of the present invention there is provided a web services architecture comprising: a root originating service requestor; a hierarchy of services in which a service of a first level calls a service of a lower level; a directory for finding services in the hierarchy; a ranking machine with means for applying a choice algorithm for services based on the originating service requestor's preference regarding one or more services; wherein, at each level of the hierarchy, the directory provides a set of possible services and the ranking machine applies the choice algorithm to provide a sequence of preferred services.

The lower-level services may be service requesters or service providers.

The ranking machine is preferably connected to the directory by a port and the set of possible services is referred to the ranking machine by the directory and the sequence of preferred services is returned to the directory by the ranking machine.

A service of a first level may find a service of a lower level by means of a UDDI directory. The ranker machine may have a port on the UDDI directory and may process flows turning TModel bags into a selected set of TModels.

Each UDDI operation may be referred to the ranking machine and may be returned as a sequence conforming with the service requestor's preference.

Underlying UDDI application code may carry out the referral and may append the location of the ranker machine to subsequent XML flow.

According to a third aspect of the present invention there is provided a computer program product stored on a computer readable storage medium for a web services architecture having a hierarchy of services with a root originating service requestor, a service of a first level calling a service of a lower level, comprising computer readable program code means for performing the steps of: the originating service requestor indicating a preference regarding one or more services and a ranking machine having a choice algorithm based on the preference; the originating service requestor invoking services of one or more levels of hierarchy; at each level of the hierarchy, a service using a directory to find a set of possible lower-level services; and the ranking machine applying the choice algorithm to the set of possible lower-level services.

BRIEF DESCRIPTION OF THE SEVERAL VIEWS OF THE DRAWINGS

Embodiments of the present invention will now be described, by way of examples only, with reference to the accompanying drawings, in which.

DETAILED DESCRIPTION OF THE INVENTION

In this description, the term web services is used. This should not be construed as meaning that a web service must be invoked through the web (i.e. from a browser). A web service may be implemented in any form of network including the Internet, intranets, LANs, WANs, etc. As previously defined, a web service provides a program-to-program communication model and is described through an interface that describes the functions of the web service.

Figure 1:
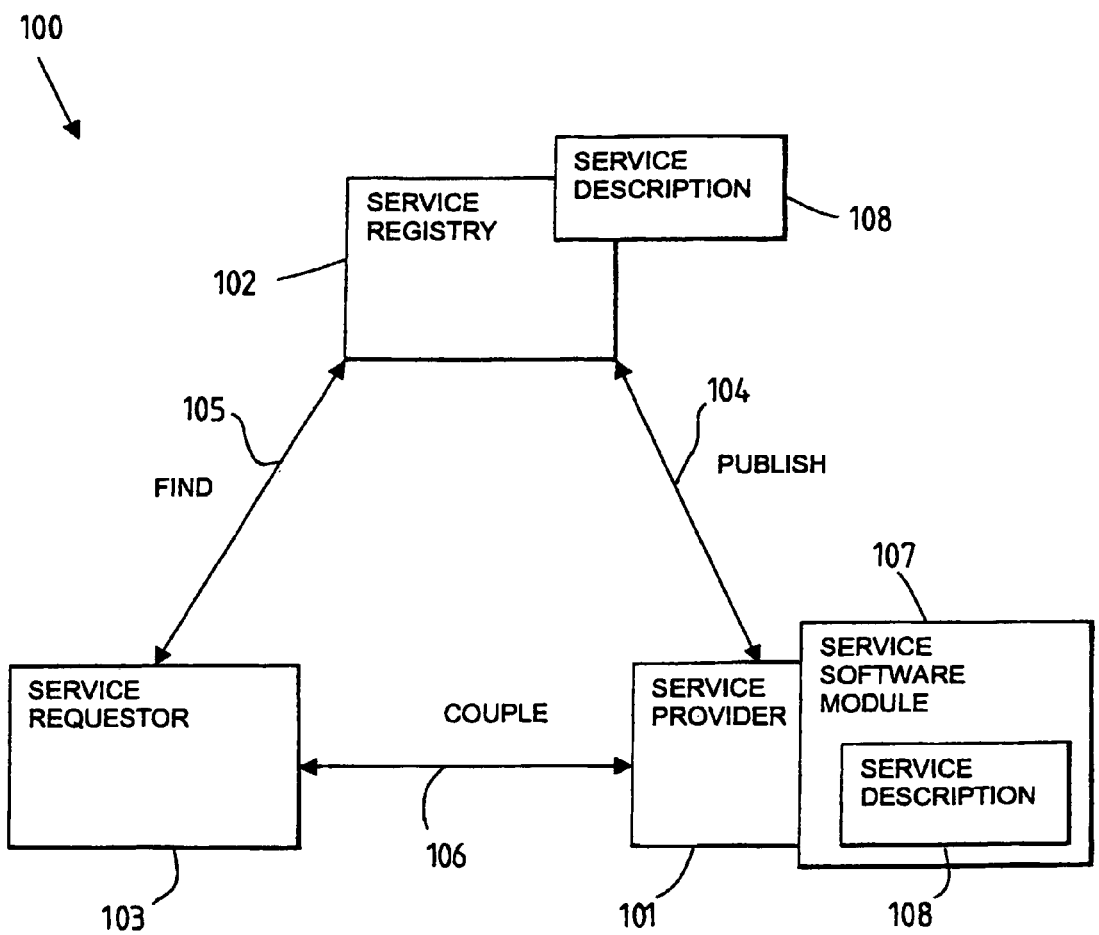
FIG. 1 is a schematic diagram of a web services model.

FIG. 1 shows a web services model 100 which shows the three roles of service provider 101, service registry 102 and service requestor 103. The interactions involve publish 104, find 105 and couple 106 operations. The couple operation 106 is an access flow between the entities in a loosely coupled environment. Together these roles and operations act upon the web services artifacts which are the web services software module 107 and its description 108.

In a typical scenario, a service provider 101 hosts a network-accessible software module 107 which is an implementation of a web service. The service provider 101 defines a service description 108 for the web service 107 and publishes it to a service registry 102. The service requestor 103 can also get the service description 108, or part of it, directly from the service provider 101 as a pull operation rather than a push operation. The service requestor 103 uses a find operation 105 to retrieve the service description 108 from the service registry 102 and uses the service description 108 to couple 106 with the service provider 101 and invoke or interact with the web service implementation 107. Service provider 101 and service requester 103 are roles and a service can exhibit characteristics of both.

The service provider 101 is the platform that hosts access to at least the front end of the service. A service requestor 103 is the application that is looking for and invoking or initiating an interaction with a service. The service requestor role can be played by a browser driven by a person or a program without a user interface, for example another web service. A service registry 102 is a searchable registry of service descriptions 108 where service providers 101 publish their service descriptions 108. Service requestors 103 find services and obtain coupling information from the service description 108 to establish communication and execution for services.

To be accessible, a service description 108 needs to be published 104 so that the service requestor 103 can find it. In the find operation 105, the service requester 103 retrieves a service description 108 directly or queries the service registry 102 for the type of service required using a service discovery process. In the couple operation 106, the service requestor 103 invokes or initiates an interaction with the service at runtime using the coupling details in the service description 108 to contact and invoke the service.

The service description 108 contains the details of the interface to implement the service. This includes its data types, operations, coupling information and network location. It could also include categorization to facilitate discovery and utilization by service requesters 103.

Figure 2:
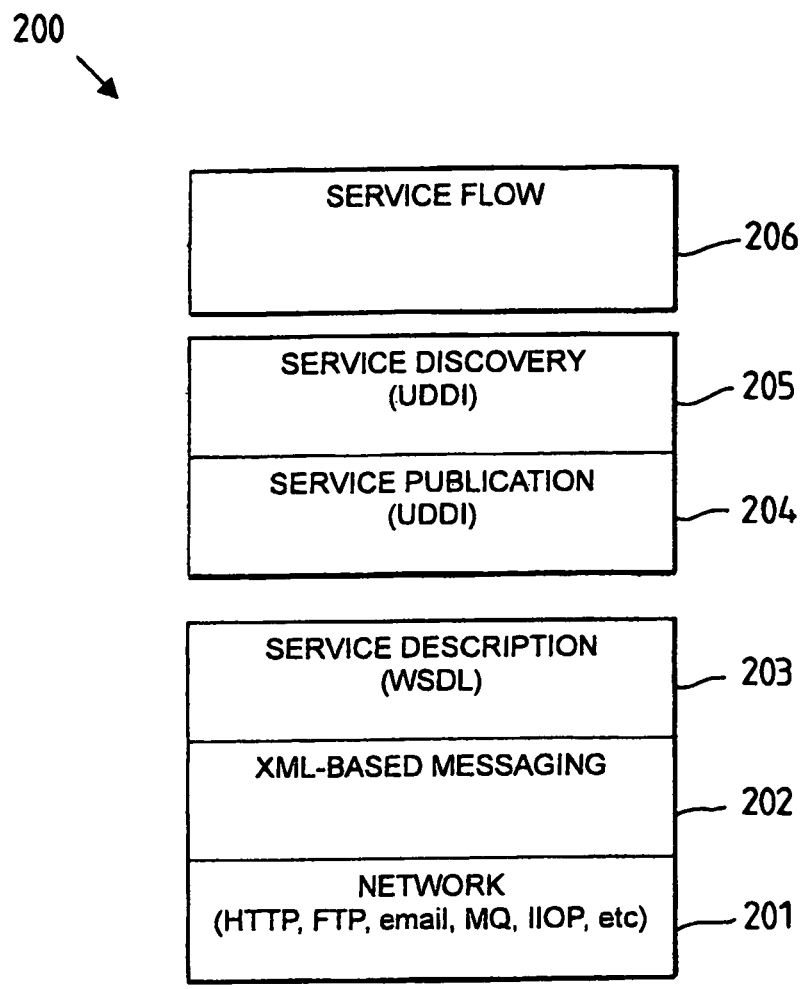
FIG. 2 is a schematic diagram of a web services stack.

Referring to FIG. 2, in order for the three operations of publish, find and couple to perform in an interoperable manner, there must be a web services stack 200 that embraces standards at each level.

The foundation of the web services stack 200 is the network level 201 as web services must be network-accessible to be invoked by a service requester. Standard technologies that apply to the network level 201 of the stack 200 include HTTP, FTP, email, MQSeries, IIOP, etc.

The next level is an XML-based messaging level 202 which represents the user of XML as the basis for the messaging protocol. SOAP may be used as an enhancement to the XML messaging protocol.

The next level is the service description level 203 which is a collection of description documents. The description is grouped into three types of things, namely location, activity and interface. WSDL is the standard for XML-based service description. WSDL defines the interface and mechanics of service interaction. The WSDL document can be complemented by other service description documents to describe higher level aspects of the web service, for example, business context is described using UDDI data structures in addition to the WSDL documents.

The first three levels of the network level 201, the XML-based messaging level 202 and the service description level 203 are required to provide or use any web service.

The next two levels of the stack 200 shown in FIG. 2 are the service publication and service discovery levels 204, 205 which can be implemented with a number of solutions. Any action that makes a WSDL document available to a service requestor is a service publication. A public UDDI registry holds copies of the service publications.

A web service cannot be discovered if it has not been published and therefore the service discovery level 205 depends on the service publication level 204. The variety of discovery mechanism parallels the publication mechanisms. Any mechanism that allows the service requester to gain access to the service description and make it available to the application at runtime qualifies as a service discovery.

The top-most level 206 of FIG. 2 is the service flow level 206 which describes how service-to-service communications, collaborations, and flows are performed.

A complete web services description builds on the basic WSDL description of the service. A complete web services description addresses the following: the business that hosting the service; the kind of business it is; the products that are associated with the service; the categories the business or web service is associated with; the aspects that would influence a requester to choose to invoke a service; the keywords that can be provided so that it is easier to find the service; etc.

Figure 3:
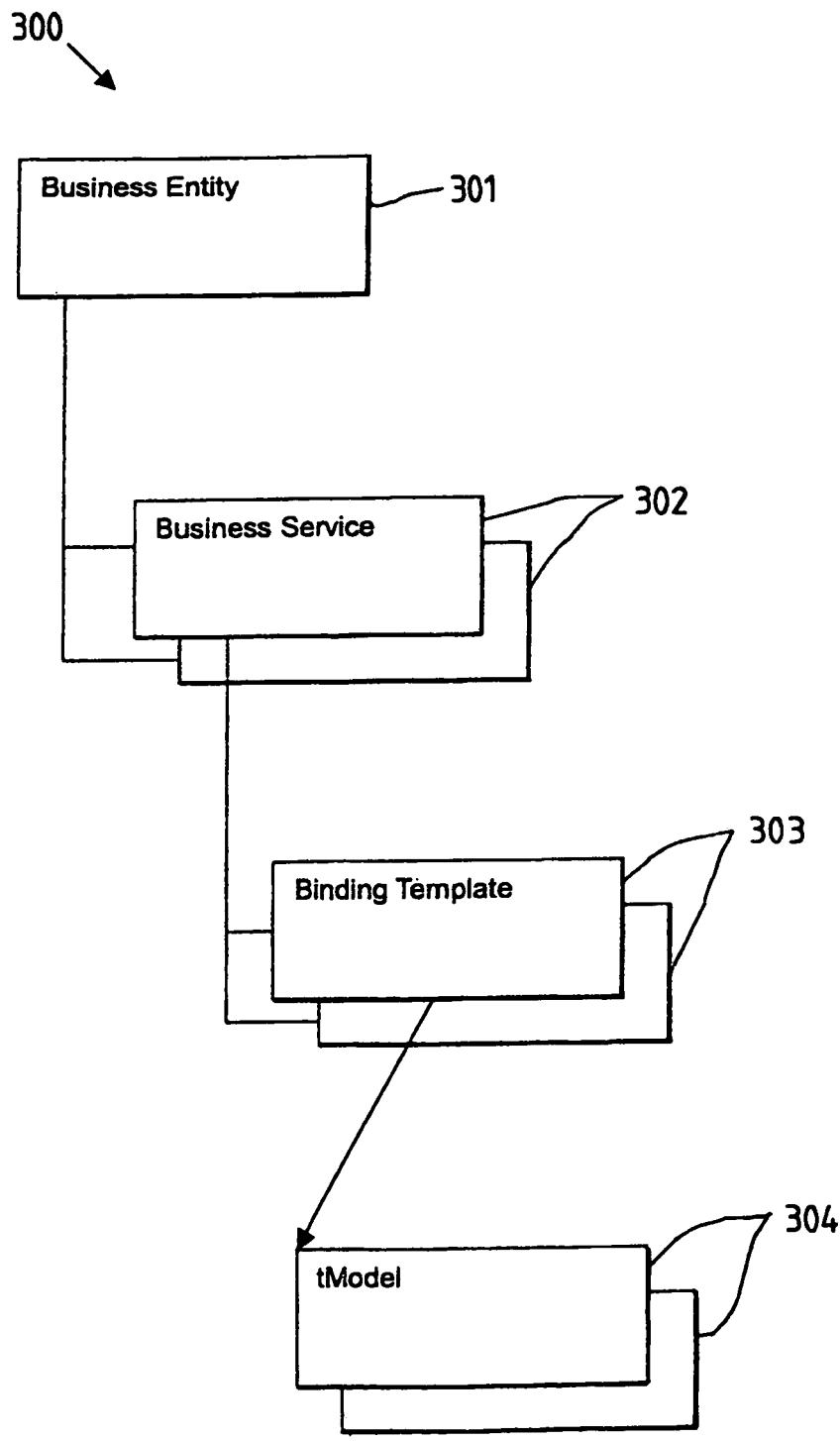
FIG. 3 is a block diagram of a UDDI data structure.

UDDI provides a mechanism for holding descriptions of web services. Although UDDI is often thought of as a directory mechanism, it also defines a data structure standard for representing service description information in XML. FIG. 3 shows a UDDI entry 300 with four fundamental data structures.

A UDDI entry starts with a business entity 301. A business entity 301 models information about a business. The business entity 301 contains a collection of business services 302, one for each web service the business wishes to publish. Each business service 302 contains technical and descriptive information about a business entity's web service. A business service 302 contains a collection of binding templates 303.

A binding template 303 describes the access information, for example the endpoint address, and describes how the business service 302 uses various technical specifications. A technical specification is modeled as a tModel 304. A tModel 304 can model many different concepts such as: a type of service, a platform technology such as HTTPs or a taxonomy. A business entity 301, a business service 302 and a binding template 303 are implemented using a tModel of a defined type. The collection of binding templates 303 associated with a business service 302 represents a fingerprint of the technologies used by the business service 302.

A tModel 304 defines the calling interface and the results. It is rendered in XML at a high level and via an API at the lower level which is not seen by the user. A tModel 304 has a unique identifier referred to as the key. UDDI supports the use of a given tModel 304 in more than one place via specification of the same key and then guarantees that the behavior in the two places, as far as the externals are concerned, is exactly the same with no additional platform-specific return codes.

The described method and system include a reference on all UDDI operations to the originator of the request. Once a directory or registry has processed the request, the results are then referred to this reference for filtering.

Figure 4A:
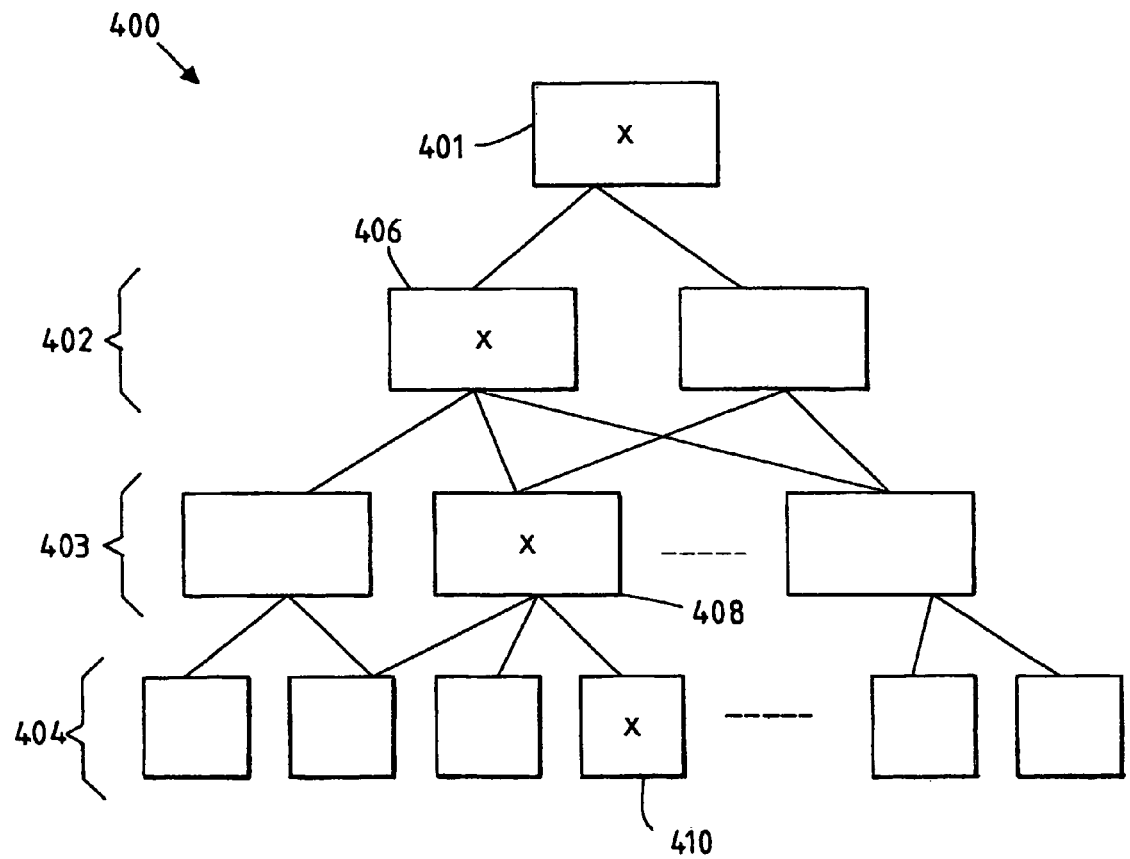
FIG. 4A is a schematic block diagram of a web services hierarchy in accordance with the present invention.

Referring now to FIG. 4A, a web services hierarchy 400 is shown. A root node of the tree hierarchy 400 is a service requester 401 which wishes to invoke a web service.

The tree hierarchy 400 has a number of service levels 402, 403 which represent intermediate services which may be invoked (directly or indirectly) by the service requester 401 in order to find the end web service that the service requestor 401 wishes to invoke. The end web services 404 are the leaf nodes on the tree hierarchy 400. Level 402 may be a selection of a service by the service requester 401 and levels 403 and 404 may be a selection of hidden sub-services which are not visible to the service requester 401.

Figure 4B:
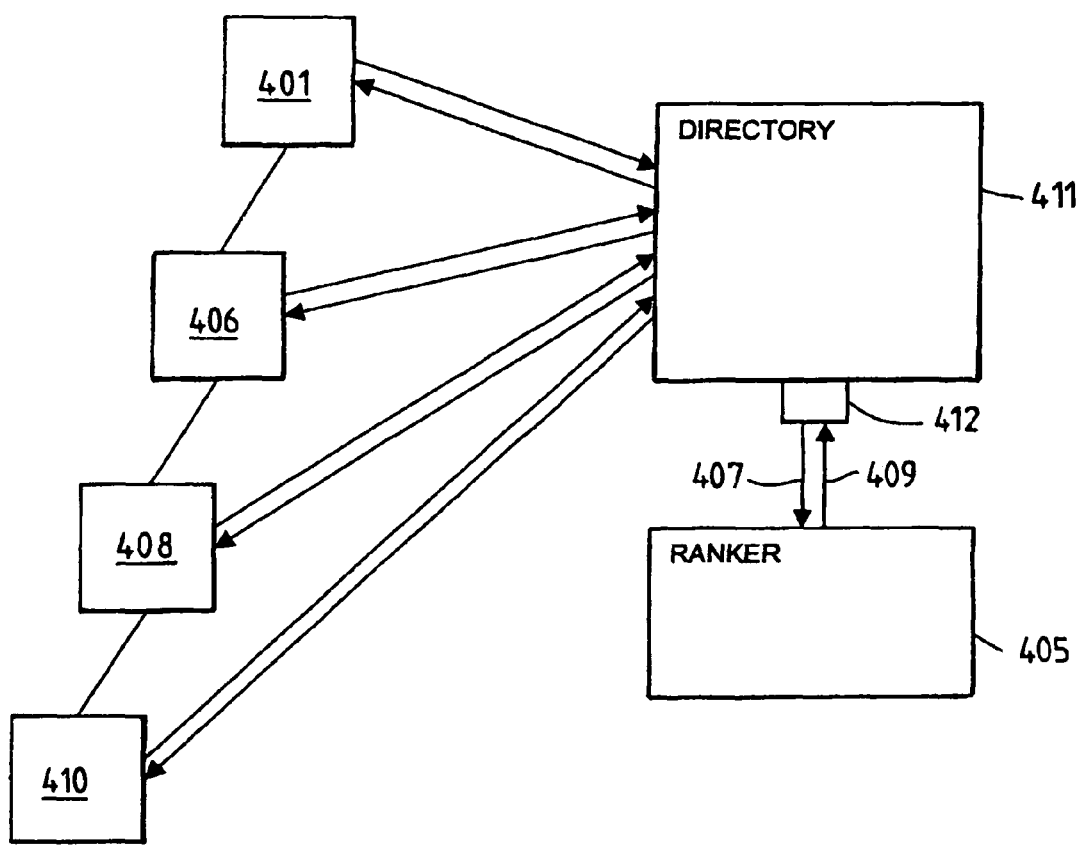
FIG. 4B is a schematic block diagram of a web services architecture in accordance with the present invention.

Referring now to FIG. 4B, only selected services 406, 408, 410 on each of the levels 402, 403, 404 are shown. A directory 411 is provided which is used to find a group or bag of possible results in the form of services or service providers.

A ranker machine 405 is provided which stores details of the service requestor's 401 preferences for service selection. This is provided in the form of a choice algorithm between options presented at any relevant time to the ranker machine 405. The service requestor 401 informs the ranker machine 405 of its preferences for any service provider and a choice algorithm is saved that ranks preferences for service providers.

In a first embodiment, the ranker machine 405 listens on a port 412 on the directory 411. When the directory 411 carries out a look up and produces a bag of results, the ranker machine 405 is listening on the port 412 and the bag of results is sent 407 to the ranker machine 405. The ranker machine 405 applies its choice algorithm to the bag of results and returns 409 a sequence of results in the preferred order of the service requestor 401 to the directory 411. The directory 411 answers the look up with the sequence of results provided by the ranker machine 405.

All intermediate service providers 402, 403 that look up services in the directory have the look up referred to the ranker machine 405 which filters results of searches in accordance with preferences indicated for the service requestor 401. If there is a preference stored in the ranker machine 405, the ranker machine 405 makes the selection based on the preference and the intermediate service provider 402, 403 will follow the preference when invoking a service provider of a next level.

In the illustrated example of FIGS. 4A and 4B, a service requestor 401 wishes to use the service of an intermediate service provider of the first level 402 which involves using a lower level service. However, the fact that any lower level service is used is not revealed to the service requestor 401. The service requester 401 carries out a search using the directory 411 for service providers of the first level 402 and obtains a sequence of possible service providers 402. The sequence of possible service providers 402 has been filtered by the ranker machine 405 to remove obvious non-contenders or to force a specific selection (i.e. if only one result is in the bag). If there is more than one result in the bag, the service requestor 401 chooses one of the service providers 406 of the first level 402.

Each look up response provided by the directory 411 produces a bag of potential candidates which is filtered by the ranker machine 405. Software in the directory 411 does the referring to the ranker machine 405. The entity which requested a look up in the directory 411, is returned a list of results as if the ranker machine 405 was not there. The entity which requested the look up has free choice of the results returned to it by the directory 411, but the results returned have already been restricted by the ranker machine 405.

The service requester 401 only communicates with the service provider 406 of the first level 402. However, in order to do its work, the service provider 406 uses service provider 408 of the second level 403 which in turn uses the end service 410. The service requestor 401 does not know about service providers 408 of the second level or the end service 410. Similarly, the service provider 406 of the first level does not know about the end service 410 used by the service provider 408 of the second level.

The service provider 406 of the first level 402 carries out a look up of the directory 411 to find a service provider 408 of the second level 403. Similarly, the service provider 408 of the second level 403 carries out a look up of the directory 411 to find an end service 410. At each look up, the bag of results found by the directory 411 is ranked by the ranker machine 405 in accordance with the originating service requestor's 401 preferences. The preferences used by the ranker machine 405 in its choice algorithm are global and level independent in the hierarchy.

In a second embodiment, the directory returns the results of a look up request to the requestor which may be the originating service requestor or an intermediate service provider and the requestor sends the bag of results to the ranker machine for ranking. The ranking machine returns a sequence of results to the requestor.

In both the embodiments, the service requestor's preferences may relate to quality of service issues such as cost, efficiency, speed and reliability or may relate to any other selection influencing preference. The preference can rank services in an order the service requestor would like to use the services or may specifically exclude a service from use, or may provide any other preferential indication.

No reasoning is required by the service requester as to why a preference is recorded and the preferences do not need to be visible or understood by the intermediate service providers. Control of the sub-service selection is taken away from the supplier or at least influenced by the original service requestor.

Example 1

Figure 5A:
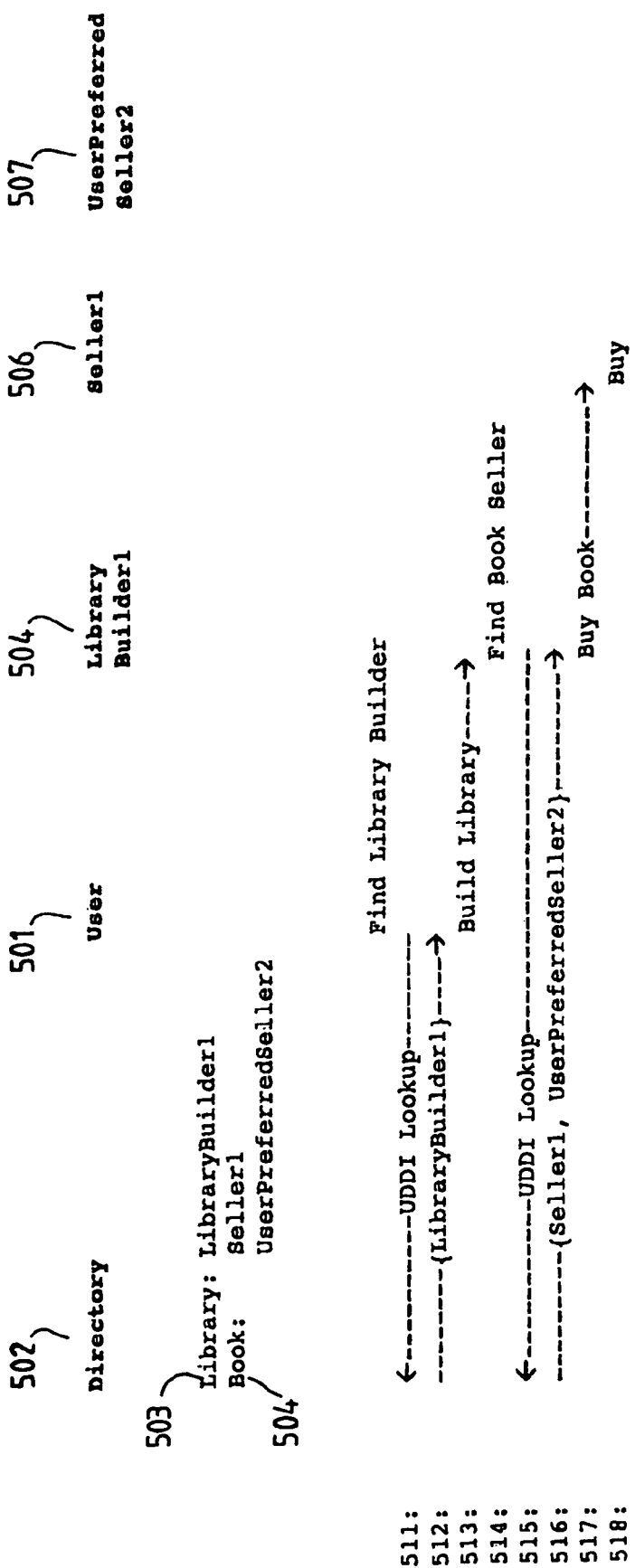
FIG. 5A is a flow line diagram of a selection of a service as known from the prior art.

The following is an example of the invocation of a web service by a service requester referred to as the user. FIG. 5A shows how a prior art UDDI Lookup request would work. The UDDI directory returns a bag as its result, indicated here as a {set}.

The user 501 wants to build a library, so he asks the UDDI directory 502 to find him a service provider 503 which does this. The user 501 sends a request 511 to the directory 502 for a UDDI Lookup to find Library Builders. In this case there is only one service provider 503 of this category and so the directory 502 returns 512 the result of the set of {LibraryBuilder1}.

The user 501 then sends a request 513 of "Build a Library" to the server LibraryBuilder1 504. LibraryBuilder1 504 then looks up 514, 515 in the UDDI directory 502 a list of book suppliers 505. The directory 502 returns 516 the set of {Seller1, UserPreferredSeller2}. The LibraryBuilder1 504 then picks 517 the first supplier which is Seller1 506 or what he thinks is the most suitable supplier to use to buy the book from. This results in the book being purchased 518 from a place advantageous to the LibraryBuilder1 but not the preferred seller of the user which in this case is UserPreferredSeller2 507.

Figure 5B:
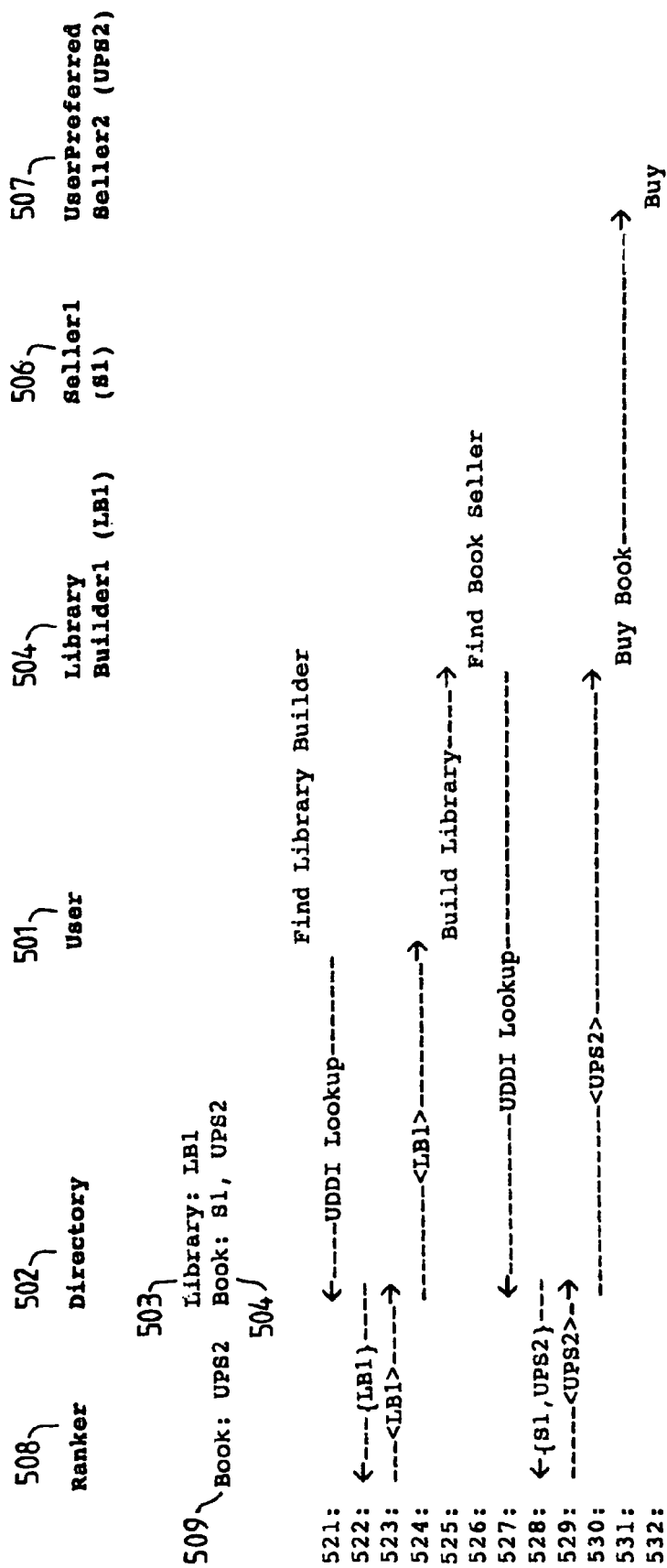
FIG. 5B is a flow line diagram of a first embodiment of a selection of a service in accordance with the present invention.

FIG. 5B shows the same UDDI Lookup as FIG. 5A but in accordance with a first embodiment of the present invention. The described method and system requires that each UDDI request should be referred to a place which can rank the returned bag in an order according to the preferences of the user. It is not relevant as to what criteria are used in this ranking, only that it happens.

Thus, the {bag} is returned as a <sequence>, with the preferred items at the front of the list. The sequence may contain all the members of the bag, a subset or even something completely different. It is the underlying UDDI lookup code (in other words the underlying UDDI APIs) which do this referral. Extra code steps are not required by the caller.

FIG. 5B has the additional component of the ranker 508 which holds a choice algorithm reflecting the preferences indicated by the user 501 for the book suppliers 509.

The user requests 521 the UDDI directory 502 to find a Library Builder. The directory 502 finds the set {LibraryBuilder1}. However, this is not exposed to the user 501, as the underlying layers of service providers know that a local request without a referral still has to be ranked and this is done via configuration options and so not visible to the user. Thus, the return flow from the UDDI directory 502 is then referred 522 to the local ranker 508 for analysis. As there is only one choice, which is acceptable <LibraryBuilder1>, the results are unchanged and so sent 523 initially back to the UDDI directory 502 which sends 524 the results back to the user 501.

The user 501 then picks the first (and only in this example) supplier 504 and invokes the Build Library operation on it 525. The underlying layers know that this is a XML/SOAP request for a service and so append the location of the required ranker 508 to the XML flow.

The supplier, LibraryBuilder1 504, then requests 526 that the UDDI directory 502 finds a list of Book Sellers 504 and appends on the flow the location of the relevant ranker 508. This directory Lookup 527 returns the held set of Book Sellers {Seller1, UserPreferredSeller2}. The underlying layers then refer 528 this set to the ranker 508 as before. In this case, the ranker 508 wants to force use of the user's preferential Book Supplier 509, and so alters the UDDI result to the sequence <UserPreferredSeller2> before sending 529 the result back to the UDDI directory 502 which sends 530 the result back to the Library Builder 504 as the result of its lookup 527. Consequently, the book is now ordered 321, 322 from UserPreferredSeller2 507 rather than Seller1 506.

Figure 5C:
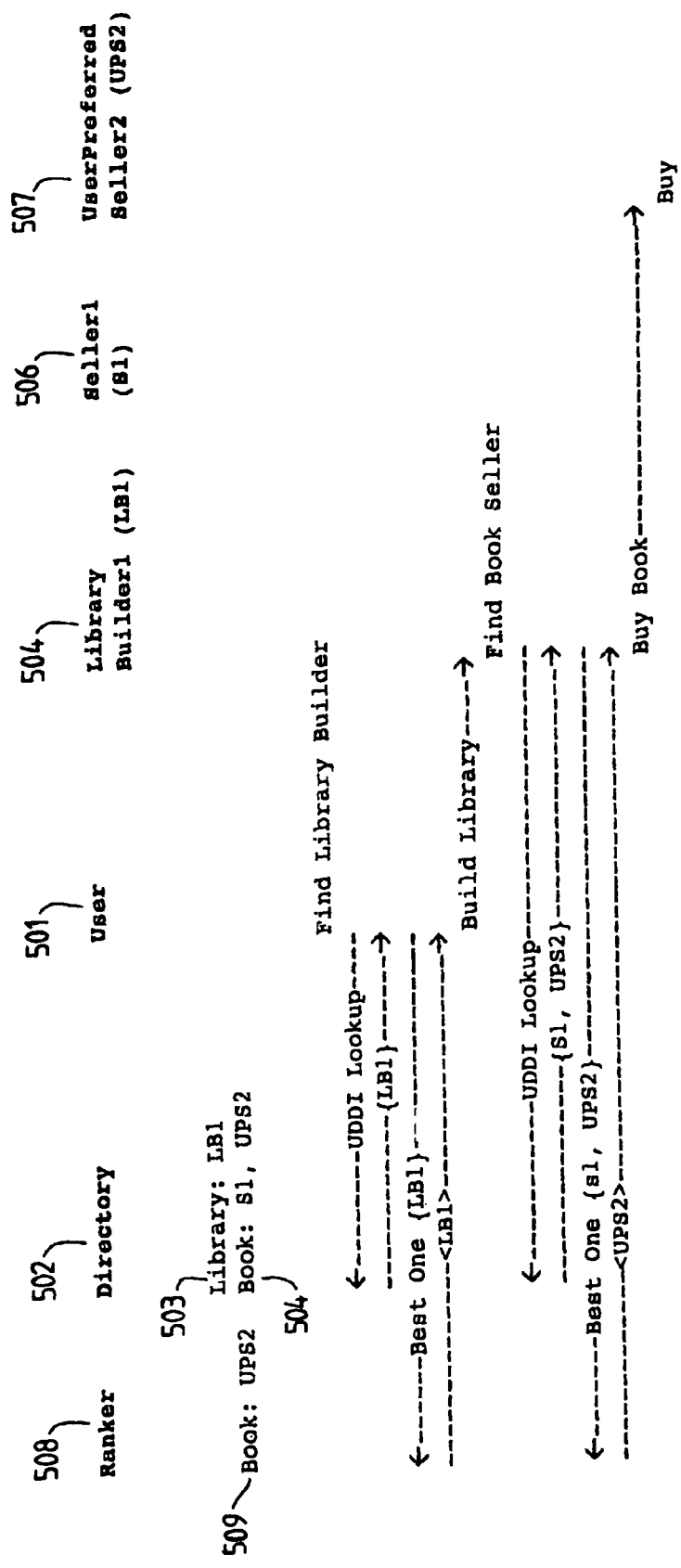
FIG. 5C is a flow line diagram of a second embodiment of a selection of a service in accordance with the present invention.

FIG. 5C shows the same UDDI Lookup as FIGS. 5A and 5B but in accordance with a second embodiment of the present invention. As in FIG. 5B, the described method and system requires that each UDDI request should be referred to a place which can rank the returned bag in an order according to the preferences of the user. It is not relevant as to what criteria are used in this ranking, only that it happens.

Again, the {bag} is returned as a <sequence>, with the preferred items at the front of the list. In the second embodiment, the requester of a look up to the UDDI directory 502 receives the {bag} of results and refers the bag to the ranker 508 for ranking and the requestor then receives the <sequence> from the ranker 508 in accordance with the user's 501 preferences.

Implementation

In the first embodiment, a ranker machine is listening on a UDDI/Ranker port and processes the aforementioned flows turning a tModel bag into a selected bag of tModels.

In terms of the UDDI API the 10 find_xx verbs are extended by adding the URL:port of the ranking machine.

For example,

```
<find_tModel [maxRows="n"] generic="2.0"
xmlns="urn:uddi-org:api_v2">
[<findQualifiers/>] [<name/.] [<identifierBag/>] [<categoryBag/>]
</find_tModel>]
would turn into:
<find_tModel [maxRows="n"] generic="3.0"
xmlns="urn:uddi-org:api_v3">
[<Ranker>ranker_url</Ranker>]
[<findQualifiers/>] [<name/>] [<identifierBag/>] [<categoryBag/>]
</find tModel>]
```

In terms of the SOAP/XML execution of the service, this will be extended to include the ranker URL. It is a requirement of the UDDI paradigm that this must be passed on to subsequent UDDI-related invocations.

```
<wsdl:declarations>
.......
.......
    <wsdl:ranker> ?
        <wsdl:rankerurl [port="nn"]>url</wsdl:rankerurl>
    </wsdl:ranker>
.......
.......
</wsdl:declarations>
```

The flow is inserted or processed by the WSDL supplier or at any rate the function lurks in either the UDDI server (as the A address:port gets passed on the lookup request) or in the caller's DLL used for UDDI processing. In either case, the UDDI lookup process does the filtering without the intervention of the caller.

If the service that receives this ranker address does not bother to pass it on for subsequent UDDI/XML/SOAP operations, this would be a protocol violation and so the service would not behave according to the rules. Like all other standards in this arena, this would be self policing.

However, a new entry is added to the binding template and business service tModels to show whether or not the service obeyed these rules. This element can be considered to be <RankingSupported/>. The find_xx APIs would then not select a tModel if a <RANKER> element is supplied on the call and <RankingSupported/> is not present.

In terms of API execution, this is, essentially, done on the box that hosts the UDDI directory. The code that does the selection is modified to support the new API and tModel tags.

Therefore, this description has shown how the use of a ranker machine to process URL requests together with associated extensions to UDDI/WSDL protocols can introduce the new originators preference selection function into the UDDI paradigm.

In a situation where one service provider is unavailable and another needs to be selected, the following applies. The actual services themselves are specified at the interface (parameter calling) level by a specific Binding tModel. If a specific service is wanted, then a specific tModel must be used (or else lots of different XML invocations are coded) called the Binding Template. The problem arises if the supplier which uses the specific tModel is undesirable (too slow, too expensive, not working etc.) and the code cannot be altered to use another supplier with a different interface.

To avoid the recoding problem another supplier must be selected with exactly the same interface: in other words one which uses the same Binding tModel. This is easily done via UDDI lookup.

It should be noted that UDDI supports Public (i.e. generally available) Directories and Private (i.e. specific to the caller) Directories. This is fine if the whole of the requested service lies within the scope of the Private Directory (within the same organization and so using the same—or replicated— UDDI server) so preference issues can be addressed by what actually goes in this Private Directory. However, this approach fails if a request is executed outside the scope of the Private Directory. The described method and system overcome this problem.

It should also be noted that UDDI supports a tModel for PublisherAssertion. This aims to link suppliers into some sort of larger entity. This is not an overlap with the described method and system as PublisherAssertion is Public, Static and there is no guarantee that it will be taken notice of.

Improvements and modifications can be made to the foregoing without departing from the scope of the present invention.

The invention claimed is:

1. A method for ranking services in a web services computer hardware architecture having a hierarchy of services with a root originating service requestor, a service of a first level in the hierarchy calling a service of a lower level, the method comprising:

indicating a preference regarding at least one service and a ranking machine having a choice algorithm based on the preference;

invoking services of at least one level of hierarchy;

finding a set of possible lower-level services, by a service, using a directory at each level of the hierarchy;

applying the choice algorithm to the set of possible lower-level services.

2. The method according to claim 1, wherein the lower-level services are selected from service requestors and service providers.

3. The method according to claim 1, further comprising:
referring the set of possible lower-level services to the ranking machine from the directory, and
returning a preferred sequence by the ranking machine to the directory.

4. The method according to claim 3, wherein
the referring is not visible to the service using the directory.

5. The method according to claim 1, further comprising:
sending the set of possible lower-level services by the service using the directory to the ranking machine; and
returning a preferred sequence by the ranking machine to the service.

6. The method according to claim 1, further comprising:
returning a single result or a sequence of results to the service using the directory.

7. The method according to claim 1, wherein
lower-level invocations of services in the hierarchy are not visible to higher-level services.

8. The method according to claim 1, wherein
the preference comprises at least one of
 ranking services in an order in which the originating service requestor intends to use the services,
 excluding services from being used, and
 providing other selection-influencing criteria.

9. The method according to claim 1, wherein
the preference is based upon quality of service criteria comprising at least one of cost, efficiency, speed, and reliability.

10. The method according to claim 1, wherein
the preference overrides a selection by the service using the directory.

11. The method according to claim 1, wherein
upon the preferred service not being available, a subsequent service is obtained by reference to original preference.

12. A computer program product for a web services architecture having a hierarchy of services with a root originating service requestor, a service of a first level calling a service of a lower level, the computer program product comprising:
 a computer readable medium having computer readable program code embodied therein, the computer readable program code comprising computer readable program code configured to cause a computer to perform the operations of:
 indicating a preference regarding at least one service and a ranking machine having a choice algorithm based on the preference;
 invoking services of at least one level of hierarchy;
 finding a set of possible lower-level services by a service using a directory at each level of the hierarchy;
 applying the choice algorithm to the set of possible lower-level services.

* * * * *